Sept. 26, 1967   R. HÜBNER   3,343,402
GAS ANALYZER WITH TESTING MODE
Filed March 16, 1965   2 Sheets-Sheet 1

Rolf Hübner
INVENTOR.

BY Karl G. Ross
Attorney

Sept. 26, 1967  R. HÜBNER  3,343,402
GAS ANALYZER WITH TESTING MODE
Filed March 16, 1965  2 Sheets-Sheet 2

INVENTOR:
Rolf Hübner

BY
Karl F. Ross
Attorney

United States Patent Office

3,343,402
Patented Sept. 26, 1967

3,343,402
GAS ANALYZER WITH TESTING MODE
Rolf Hübner, Gabelsbergerstr. 31, Dortmund, Germany
Filed Mar. 16, 1965, Ser. No. 440,223
Claims priority, application Germany, Mar. 19, 1964,
H 52,104
7 Claims. (Cl. 73—23)

This application is a continuation-in-part of my copending application Ser. No. 427,047, filed January 21, 1965.

My present invention relates to portable gas analyzers for the detection and measurement of noxious gaseous components in an underground atmosphere or similar environment where certain gases, such as methane, carbon dioxide and carbon monoxide, are found to be present and are injurious to health and/or constitute an explosion hazard.

In my copending application mentioned above, I describe and claim an instrument for the detection and measurement of gaseous constituents of an ambient atmosphere, which instrument includes at least one measuring chamber into which aliquots of ambient gas can be drawn via a suitable electrically operable pumping means; the device is provided with one or more detection circuits or measuring means adapted to measure an electrical parameter of the gas contained within the measuring chamber and having indicator means providing audio and/or visual indicia of the concentration of the gas to be subjected to analysis.

The improved circuitry of this aforementioned application includes electronic timer means in circuit with the source of electric current (e.g. a primary or secondary battery), the pumping means and the measuring network for energization by a manually operable or programmed switching device serving to initiate operation of the pump for a period sufficient to draw a gas sample into the testing chamber prior to operation of the measuring circuit for analyzing the gas.

Circuits including such timer means are effective to prevent premature energization of the measuring network and to prevent continued operation of the pumping means beyond the time required to draw the requisite quantity of ambient gas into the testing chamber. It has been found, however, that it is frequently necessary to test instruments of this type to determine whether their respective measuring circuits are operable. Particularly in subterranean environments, such test must be carried out with great frequency to provide a reasonable measure of certitude that the analyzer, upon which workers in the environment rely for their well-being, will always manifest a true indication of the conditions. It is not uncommon, therefore, for such facilities to be provided with large numbers of such analyzers, all of which must be subjected to the routine evaluations mentioned above. With instruments of the type described, however, each test requires a minimum period determined by the length of time that the pump must operate (i.e. the delay time of the timing circuit) before the measuring circuit is operable for evaluation. The period of time so consumed by the testing personnel after actuation of the switch means is the product of the number of units and the delay duration; since the operation of the pumping means is unnecessary for a determination as to the operability of the measuring circuit, many man-hours of labor are wasted in the operation.

It is an object of the present invention to extend the principles set forth in my above-identified copending application and afford a method of reducing the time required for the testing of the measuring circuits of such devices.

A more specific object of this invention is to provide, in a portable gas analyzer having pump means, a measuring circuit and timers means for delaying operation of the measuring circuit, an arrangement for facilitating the evaluation of the operability of the measuring circuit without the cumulative delays hitherto required for testing large numbers of such instruments.

These objects and others which will become apparent hereinafter are attained, in accordance with the present invention, by providing a gas analyzer of the general character set forth in my application Ser. No. 427,047 and entitled Portable Gas Analyzer for Testing Subterranean Ambient Air Samples, with normally closed testing-switch means in circuit with the timer means and operable to disconnect the timer means so as to render the measuring circuit energizable concurrently with operation of the manual or program actuating device and thus eliminate the delays hitherto required for operation of the pump to induce ambient samples into the testing chamber. Thus, a portable gas analyzer in accordance with the present invention will comprise one or more analyzing or testing chambers connected via a suitable duct with a constant-volume pump means characterized by the displacement of a predetermined quantity of fluid to be analyzed per unit time; a timer means in circuit with the motor of the pump means and with the measuring network is operated by the actuating device (e.g. a switch) to energize the pump motor for a predetermined period of time at the conclusion of which the measuring circuit is energized. The testing-switch means of the present invention can be inserted between the main switch and the timer means which preferably includes a transistor-switch means designed, upon operation of the actuating device, to block the energization of the measuring circiut which is simultaneously connected thereby with the source of electrical energy. It will be evident that this system renders the measuring circuit operable only after signal decay with the time constant of the electronic-switch arrangement in the normal position of the testing-switch means but immediately operable when this latter means is actuated.

To prevent inadvertent operation of the testing-switch means, whose opening is desired only when the analyzer is to be subjected to evaluation of the measuring circuit, the present invention provides that this switch means be recessed in the housing of the unit and co-operate with a pin, key or the like, normally withdrawn from the housing and carried by the tester. The pin can then be inserted into the opening provided to this purpose in the housing to open-circuit the timer and render the measuring circuit immediately operable upon manual actuation of the main switch. According to a further feature of this invention, the testing-switch means includes a pair of contacts forming a closed circuit in their normal position and obstructing the passageway for the switch-operating element. The latter can be provided with a head switch, in the fully inserted position of the element, defines a clearance with the housing so as to enable ready withdrawal of the pin. Advantageously, the testing-switch means can include a sleeve in which the actuation element is received snugly and defining a passageway therefor. The sleeve can be slotted to permit the springlike contacts to be fixed to the exterior of the sleeve and project into the path of the actuating element within this passageway.

Advantageously, the electronic-switch arrangement adapted to be inactivated by the testing-switch means includes a transistor which may be rendered conductive upon operation of the actuating switch but which is held in its nonconductive state by a time-constant network charged in the opening condition of this activating switch. This transistor can be coupled with a further transistor-switch means in series with the pump motor for controlling the operating time thereof. This transistor-switch means can have an emitter/collector circuit including this motor and adapted to energize a voltage-regulating network connected with the measuring circuit for energizing the latter upon termination of pump operation. This voltage-regulating network can, according to still another feature of this invention, be provided with means responsive to the potential of the battery, which may vary with the state of charge thereof as described in the copending application mentioned above, to maintain the voltage applied to the measuring network substantially constant as long as the source voltage remains above a predetermined level.

These and other objects, features and advantages of the invention will become more readily apparent from the following detailed description, reference being made to the accompanying drawing in which.

Figure 1:
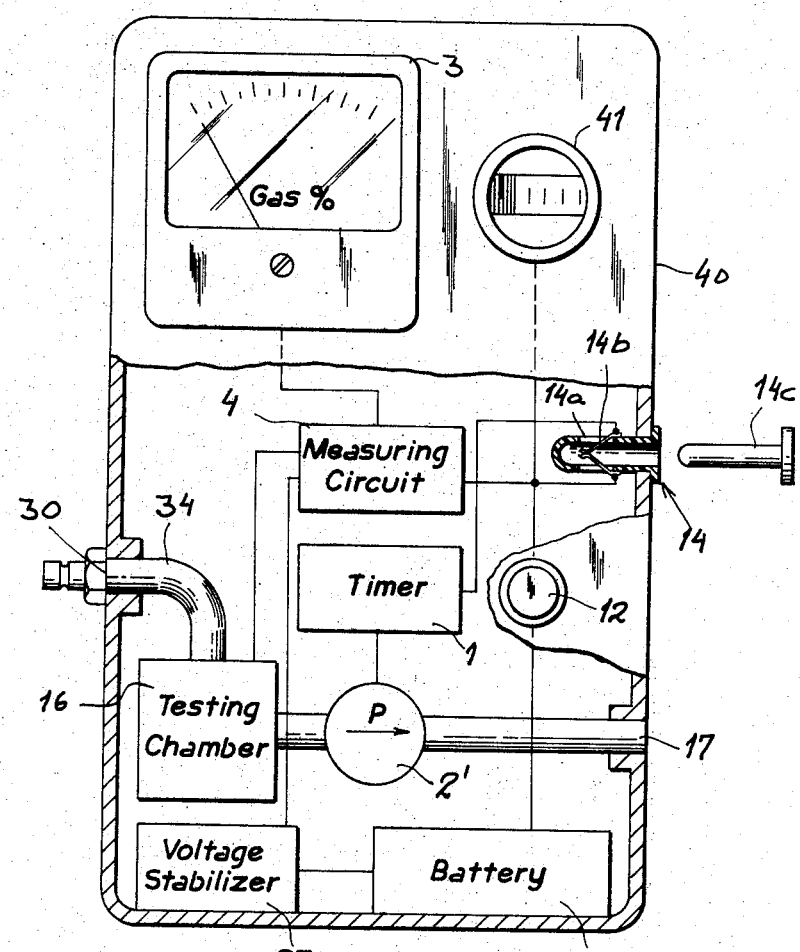
FIG. 1 is a front view, partially broken away, of a portable gas analyzer according to the invention.

As described in my copending application referred to above, the gas-analyzing instrument of FIG. 1 comprises a housing 40 having a window for the face of an indicating meter 3 which can be calibrated to indicate the percentages of noxious components in the ambient atmosphere to be tested. While only a single set of dial markings is shown on the meter 3 to indicate, for example, the concentration of methane in a subterranean gas, the circuit can include sensing means rendering it suitable for the measurement of several components merely by operation of a selector switch. Moreover, it may be desirable to provide several sets of markings upon the dial face. An auxiliary meter 41, next to meter 3, is provided to indicate the state of charge of a battery 13 as described in greater detail in said copending application. A pushbutton switch 12 on housing 40 constitutes the main switch means or actuator of the circuit. In general terms, the switch 12 energizes the timer 1 which, in turn, controls the duration of operation of the motor of pump 2' to aspirate ambient gases into the unit through an inlet 30. From this inlet 30, a duct 34 carries the gas sample to a measuring chamber 16 provided with a sensing device responsive to the concentration of the particular constituent for which the sample is to be analyzed. The sensor feeds an appropriate signal to the measuring circuit 4 at which the voltage of battery 13 is maintained constant by a voltage stabilizer 27. The measuring circuit 4 includes the meter 3.

Figure 2:
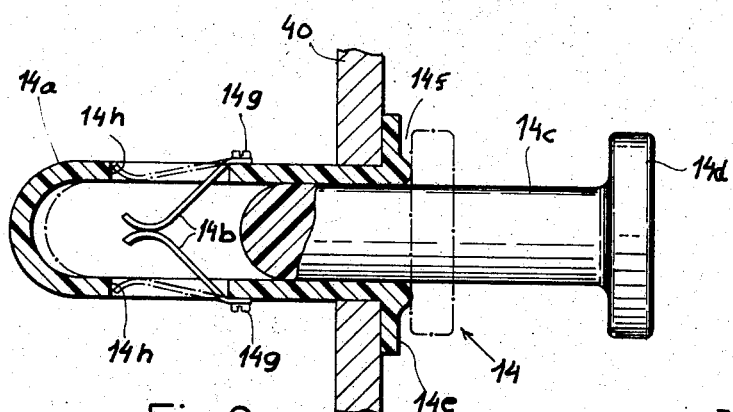
FIG. 2 is an enlarged cross-sectional view of a detail of the testing-switch means thereof.

As will be seen in FIG. 1, the timer 1 is energizable by the main switch 12 via the normally closed spring contacts 14b of a testing-switch means 14 whose sleeve 14a forms a passageway for an actuating element of pin 14c; the switch device is shown in greater detail in FIG. 2. The gas pumped out of the testing chamber 16 during induction of a further sample into the latter is discharged from the housing via an outlet 17.

An illustrated in FIG. 2, the testing switch 14 has its sleeve portion 14a slotted at the diametrically opposite locations 14h to permit the leaf contacts 14b, fastened on the exterior of the sleeve via screws 14g, to project into the sleeve and into the path of the shank 14c of the actuating element. Screws 14g also serve as terminals for connecting the contacts 14b, which normally bear upon one another, in circuit with the timer means. The head 14e of the sleeve 14a is disposed exteriorly of the housing 40 and is cut away or recessed about its periphery to define with the head 14d of the actuating element a clearance 14f enabling the testing personnel to grip and remove the actuating element without difficulty. When the shank 14c of the actuating element is fully inserted (dot-dash lines in FIG. 2) the contact springs 14b are held apart and the timer circuit is rendered inoperative. Both the sleeve 14a and the shank 14c can be composed of an electrically insulating material (e.g. a hard synthetic resin) to insulate the contact springs 14b from one another.

Figure 3:
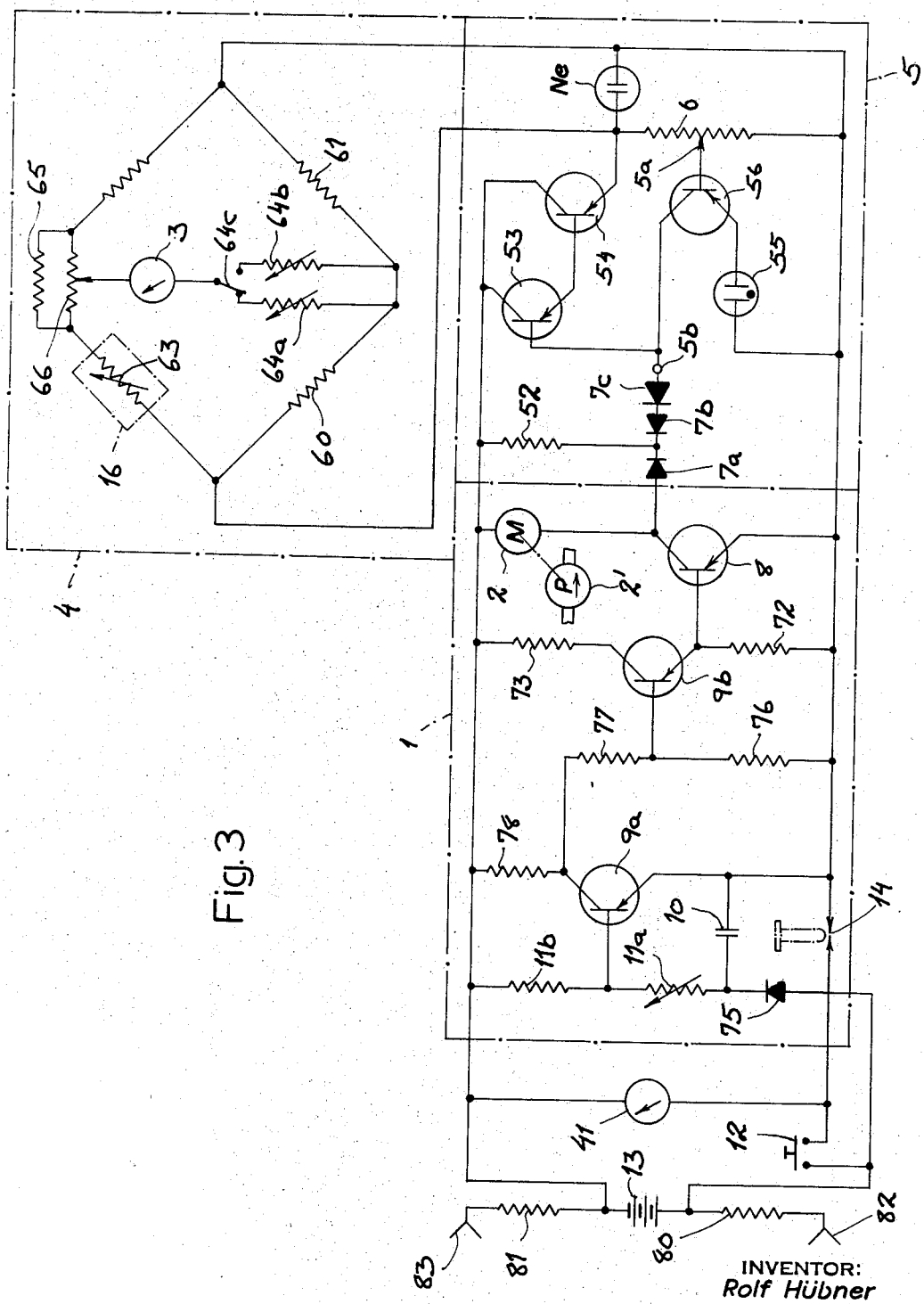
FIG. 3 is a circuit diagram of the instrument illustrated in FIG. 1 and embodying the present invention.

Referring now to FIG. 3, which shows a circuit for the gas analyzer of FIG. 1 in which the various networks are illustrated in detail, it will be seen that the battery 13 can be charged via suitable jacks 82, 83 through resistors 80 and 81 when a secondary or rechargeable device is employed as the source. The devices disclosed in my copending applications Ser. No. 412,120 filed November 18, 1964, now U.S. Patent No. 3,242,715 issued March 29, 1966, and Ser. Nos. 416,653 and 416,655, filed December 7, 1964, now U.S. Patent Nos. 3,276,241 and 3,266,293 issued October 4, 1966, and August 19, 1966, respectively, can thus be employed with the instrument. The measuring circuit 4 of FIG. 3 comprises a bridge network with four resistive-impedance arms 60, 61, 62 and 63, of which arm 63 constitutes a sensor disposed in the measuring chamber 16. This sensor may include a pair of calibrated, spaced-apart plates or wires forming a resistance- or conductance-measuring cell within the chamber 16. A balancing resistor 66, shunted by a fixed resistor 65, is inserted between bridge arms 62 and 63 and has a variable tap connected in a diagonal of the bridge via meter 3, which can be an imbalance-sensing galvanometer in series with a selector switch 64c and a pair of adjustable calibrating resistors 64a, 64b. The switch 64c permits the calibration of the motor to be selected in accordance with the particular component of the sample of interest at the time. Instead of a plurality of calibration resistors and the selector switch 64c, the meter 3 can be provided with a plurality of indicia bands each corresponding to a particular gaseous constituent.

The other diagonal of the bridge is connected across a constant-voltage source such as the voltage-regulating network, generally designated 5, which is controlled by the timing circuit 1 and includes a transistor 9a which is maintained at a potential determined by capacitor 10 charged via rectifier diode 75 from the positive terminal of battery 13 in the open condition of actuating switch 12. A pair of resistors 11a, 11b form a voltage-dividing network across the base of transistor 9a and define with the capacitor 10 a time-constant network controlling transistor 9a. A load resistor 78 is connected in the emitter/collector circuit of this transistor to develop a potential applicable to the base of a further transistor 9b whose biasing resistors are shown at 76 and 77. A resistor 72 is connected between the positive terminal of the battery 13, in the closed position of switch 12, and the emitter of transistor 9b while a resistor 73 is connected between the negative terminal and the collector. Transistor 9b serves to control a switching transistor 8 whose emitter/collector circuit is connected in series with the motor 2 of pump 2' across the battery 13.

The voltage-stabilizing network 5, inserted between the power source 13 and the measuring network 4, also includes three transistors 53, 54 and 56. The base of transistor 53 is tied to the collector of transistor 56 and is further connected through a pair of diodes 7b, 7c and the resistor 52 to the negative side of the source 13; the junction between the diodes 7b, 7c and the resistor 52 is tied to the collector of switching transistor 8 via the diode 7a. The collector/emitter circuit of transistor 54 is in series with the negative side of battery 13 and the measuring bridge 4 across which a voltage-dividing, high-ohmic potentiometer 6 is connected across the voltage-supply lines therefor. The potentiometer 6 has a tap 5a forming an input terminal for the voltage-regulating network connected to the base of transistor 56 whose collector is tied to the base of transistor 53 and whose emitter is in circuit with the positive terminal of battery 13 via a constant-voltage device such as the glow tube 55. Testing switch 14 is connected between the main switch 12 and the emitters of transistors 9a, 9b and 8.

Under normal conditions of operation of the gas-analyzing device, switch 14 is closed while prior to actuation, switch 12 is open. Capacitor 10 is charged, during this time, by way of diode 75 and maintains a positive potential at the base of transistor 9a so that this device is nonconductive as are transistors 9b, 8, 53, 54 and 56. When switch 12 is closed, however, full battery potential is applied across the meter 41, which indicates the voltage level of the source and the state of charge of the battery while applying a positive potential to the emitter of transistor 9a. Condenser 10 then discharges through resistors 11a and 11b at a rate determined by their time constant whereupon transistor 9a is maintained in a nonconductive state for the duration of this predetermined period. Transistor 9b is, however, rendered conductive and biases the base of transistor 8 negatively so that this transistor is energized and motor 2 operated during the decay time of the network 10, 11a, 11b. When the charge on capacitor 10 has been sufficiently dissipated, transistor 9a is rendered conductive and cuts off transistor 9b which then de-energizes transistor 8 and disconnects the pump motor 2 from positive battery voltage.

Part of the current traversing the transistor 8 during its entire period of conductivity, is applied via the diode 7a across the resistor 52 as a blocking potential to the terminal 5b of the voltage-regulating network 5. The base of transistor 53 and the collector of transistor 56 are both maintained, during this period, at a relatively positive potential so that transistor 54 disconnects the bridge from the negative terminal of the battery 13. When the pump 2 is deenergized and transistor 8 is quenched, the base of transistor 53 and the collector of transistor 56 become negative and tube 55 breaks down so that the three transistors 53, 54 and 56 conduct at a rate determined by the setting of potentiometer 6 and the voltage detected at tap 5a. Meter 3 then responds to indicate the degree of imbalance of the bridge as a result of the operation of sensor 63. When pushbutton 12 is subsequently released, the circuits return to normal.

When switch 14 is opened, however, by insertion of the pin 14c into sleeve 14a as previously described, the emitters of transistors 9a, 9b and 8 remain deenergized and the full battery potential is applied across the transistors 53, 54 and 56 of the voltage-stabilizing network as soon as switch 12 is closed. The measuring circuit 60 through 66 can thus be tested immediately. The structure of switch 14, with its fully removable pin 14c, prevents any inadvertent actuation of the timer cutoff during normal operation of the unit.

The invention described and illustrated admits of many modifications readily apparent to persons skilled in the art without departing from the spirit and scope of the invention as defined in the appended claims.

I claim:

1. In a gas analyzer having electrically actuatable gas-aspirating means communicating with the ambient atmosphere; electrically operable measuring means including sensing means for the analysis of aspirated gas and indicator means responsive to said sensing means for providing a measurement derived from said analysis; a source of electric potential for operating said gas-aspirating means and said measuring means; and electrically operable timer means for connecting said source with said gas-aspirating means and with said measuring means for actuating the latter after a predetermined period of operation of said gas-aspirating means, the improvement which comprises:

testing-switch means for inactivating said timer means to permit nondelayed operation of said measuring means.

2. In a gas analyzer having an electrically actuatable gas-aspirating pump means communicating with the ambient atmosphere; electrically operable measuring means including sensing means for the analysis of aspirated gas and indicator means responsive to said sensing means for providing a measurement derived from said analysis; a source of electric potential for operating said pump means and said measuring means and electrically operable timer means for connecting said source with said pump means and with said measuring means for actuating the latter after a predetermined period of operation of said pump means and inactivating said pump means after said periods; and main switch means between said source and said timer and measuring means for initiating upon actuation the commencement of said period; the improvement which comprises:

normally closed testing-switch means between said source and said measuring means for rendering said timer means inoperative and permitting nondelayed operation of said measuring means upon actuation of said main switch means.

3. The improvement defined in claim 1 wherein said testing-switch means comprises a sleeve forming a passage and a pair of leaf-spring contact elements mounted upon said sleeve and projecting into said passage while normally contacting one another therein for temporary operation of said measuring means upon insertion of a switch-actuating element into said sleeve.

4. The improvement defined in claim 3 wherein said analyzer is provided with a housing containing said pump means, said measuring means and said source, said main switch means and said testing switch means being mounted upon said housing, said sleeve extending within said housing and opening exteriorly thereof, said element being constituted as a pin having a shank receivable in said sleeve and a head defining a clearance with said housing enabling removal of said pin upon full insertion of said shank into said sleeve.

5. The improvement as defined in claim 3 wherein said electrically operable timer means includes transistor-switch means in circuit with said electrically actuatable pump means and with said switch means for energizing said pump means in a conductive condition of said transistor-switch means and in a closed condition of said main switch means, and at least one transistor control time-constant network for maintaining said transistor-switch means operative during said predetermined period and thereafter rendering said transistor-switch means nonconductive, said normally closed testing-switch means being interposed between said source and said transistor-switch means.

6. The improvement defined in claim 5 wherein said measuring means includes electronic-switch means controlled by said transistor-switch means for operating said indicator means only upon the termination of conductivity of said transistor-switch means.

7. The improvement defined in claim 6 wherein said indicator means includes a bridge network responsive to an electrical parameter of a gas analyzed by said sensing means and having an output diagonal for providing said measurement and an input diagonal, said electronic switch means constituting a voltage-regulator circuit connecting said source with said input diagonal, said electronic switch means including a switching transistor between said input diagonal and said source, a control transistor connected with said switching transistor for regulating same, and diode means between said control transistor and said transistor switch means for rendering said switching transistor nonconductive during operation of said pump means.

No references cited.

JAMES J. GILL, Acting Primary Examiner.

C. I. McCLELLAND, Examiner.